US008201446B2

(12) United States Patent
Kingdon

(10) Patent No.: US 8,201,446 B2
(45) Date of Patent: Jun. 19, 2012

(54) ULTRASONIC FLUID MEASUREMENT METHOD

(75) Inventor: James Kingdon, Bristol (GB)

(73) Assignee: Airbus Operations Limited, Bristol (GB)

( * ) Notice: Subject to any disclaimer, the term of this patent is extended or adjusted under 35 U.S.C. 154(b) by 801 days.

(21) Appl. No.: 12/172,846

(22) Filed: Jul. 14, 2008

(65) Prior Publication Data

US 2009/0019929 A1    Jan. 22, 2009

(30) Foreign Application Priority Data

Jul. 20, 2007    (GB) .................................. 0714060.1

(51) Int. Cl.
*G01F 23/00* (2006.01)
(52) U.S. Cl. ........................................ 73/290 V
(58) Field of Classification Search ................ 73/290 V; 702/55, 56; 340/450, 612; 367/908; 116/227; 33/719
See application file for complete search history.

(56) References Cited

U.S. PATENT DOCUMENTS

| | | | | |
|---|---|---|---|---|
| 4,280,126 A | * | 7/1981 | White ........................... | 340/621 |
| 4,630,245 A | * | 12/1986 | Dam ............................. | 367/93 |
| 5,095,747 A | * | 3/1992 | Smith .......................... | 73/290 V |
| 5,133,212 A | * | 7/1992 | Grills et al. .................... | 73/296 |
| 5,438,868 A | * | 8/1995 | Holden et al. ............... | 73/290 V |
| 5,670,710 A | * | 9/1997 | Atkinson ....................... | 73/61.45 |
| 5,761,955 A | | 6/1998 | Lichtenfels, II et al. .... | 73/290 V |
| 5,822,274 A | * | 10/1998 | Haynie et al. .................... | 367/99 |
| 7,107,836 B2 | * | 9/2006 | Brookner ..................... | 73/290 R |
| 2002/0083766 A1 | * | 7/2002 | Hongerholt et al. ........ | 73/290 V |
| 2005/0072226 A1 | | 4/2005 | Pappas et al. ............... | 73/290 V |
| 2008/0282817 A1 | * | 11/2008 | Breed ........................... | 73/865.9 |

FOREIGN PATENT DOCUMENTS

| | | |
|---|---|---|
| DE | 4025326 | 5/1990 |
| GB | 2412734 A | 10/2005 |
| JP | 2038822 | 7/1988 |

OTHER PUBLICATIONS

UK Search Report for GB0714060.1 dated Nov. 7, 2007.
UK Search Report for GB0714060.1 dated Mar. 19, 2008.

* cited by examiner

*Primary Examiner* — Hezron E Williams
*Assistant Examiner* — Tamiko Bellamy
(74) *Attorney, Agent, or Firm* — Lowe, Hauptman, Ham & Berner, LLP

(57) ABSTRACT

A method of measuring the level of a fluid in a tank of an aircraft, the method comprising: moving an ultrasonic transducer to a predetermined measurement position; measuring the level of the fluid by: transmitting ultrasound from the transducer into the fluid via an external surface of a wall of the tank, receiving an ultrasonic echo at the transducer, and deducing the fluid level based on the time of arrival of the ultrasonic echo; and removing the transducer from the measurement position.

A fluid tank comprising a bottom wall having an internal surface which is inclined to the horizontal; and an ultrasound guide surface which is located in the interior of the tank and oriented to direct ultrasound substantially vertically.

20 Claims, 2 Drawing Sheets

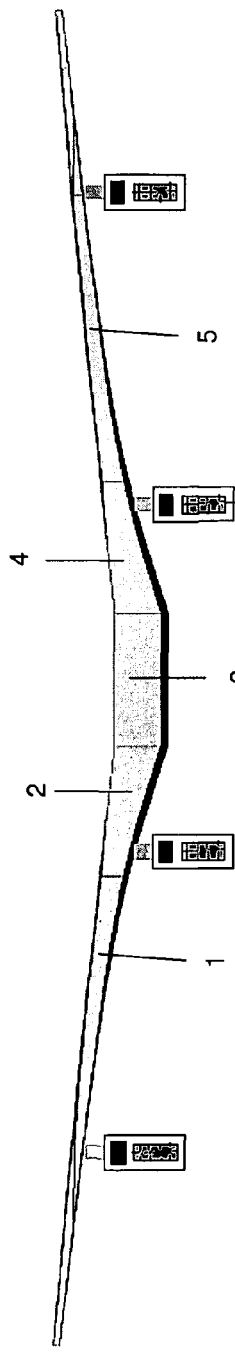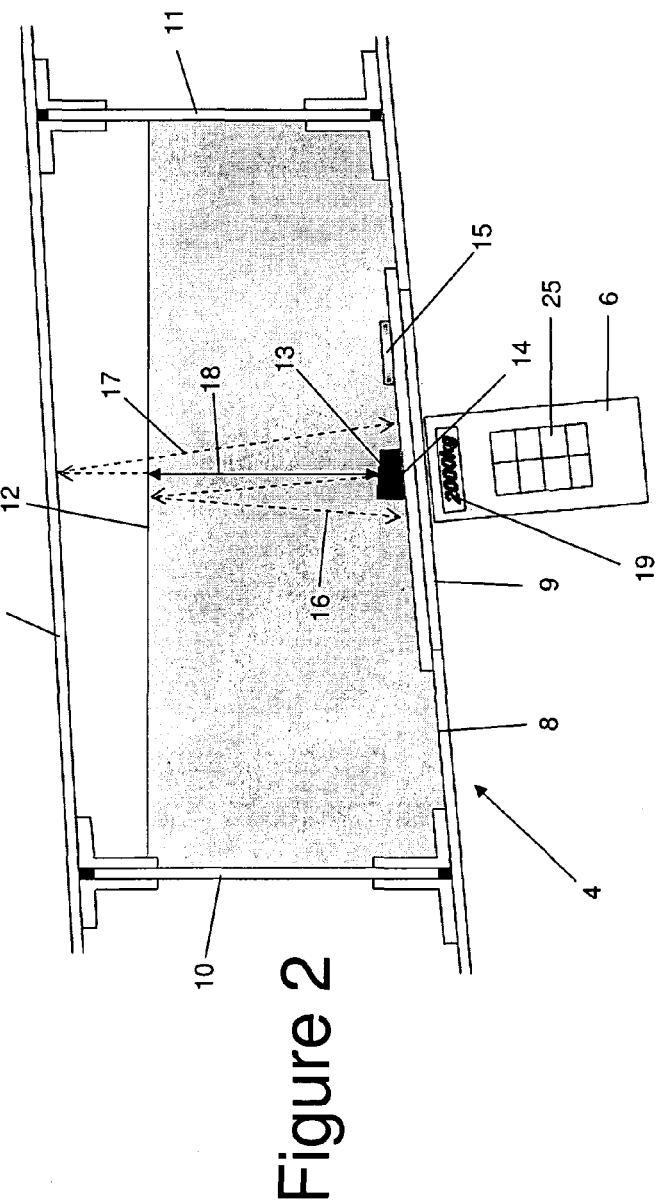

ULTRASONIC FLUID MEASUREMENT METHOD

RELATED APPLICATIONS

The present application is based on, and claims priority from, British Application Number 0714060.1, filed Jul. 20, 2007, the disclosure of which is hereby incorporated by reference herein in its entirety.

FIELD OF THE INVENTION

The present invention relates to a method of measuring the level of a fluid in a tank of an aircraft using ultrasound. The invention also relates to a tank with an inclined bottom which is specially adapted to enable the fluid level in the tank to be measured by ultrasound.

BACKGROUND OF THE INVENTION

An ultrasonic fuel-gauging system for an aircraft is described in WO 2005/015134. An ultrasonic transducer is attached to a carrier tape which is coupled to an internal surface of the fuel tank. The transducer and tape are permanently fixed in place, and thus increase the weight of the aircraft. Also, the complexity of the system makes it difficult to retro-fit to an existing in-service aircraft.

An ultrasonic fuel level monitoring device is described in US 2005/0284218. In this case the transducer unit is externally mounted. During installation, a control unit on the top of the tank is configured to constantly send ping messages to the transducer unit to allow an installer to find the correct installation spot on the bottom of the tank. The transducer unit is then permanently affixed to the tank bottom at that exact location.

SUMMARY OF THE INVENTION

A first aspect of the invention provides a method of measuring the level of a fluid in a tank of an aircraft, the method comprising:
  moving an ultrasonic transducer to a measurement position;
  measuring the level of the fluid by:
    transmitting ultrasound from the transducer at the measurement position into the fluid via an external surface of a wall of the tank,
    receiving an ultrasonic echo at the transducer, and
    deducing the fluid level based on the time of arrival of the ultrasonic echo; and
  removing the transducer from the measurement position.

The first aspect of the invention enables an ultrasonic level measurement to be made without permanently carrying the transducer (or any associated electronic systems) onboard the aircraft. Also, the method can be applied to an existing aircraft without requiring any complex system to be retrofitted to the tank.

Typically the measurement position is indicated by a visual indicator, such as a coloured mark, on the external surface of the wall of the tank.

The transducer may transmit ultrasound through the wall of the tank without directly contacting the wall, or the method may further comprise engaging the external wall of the tank with the ultrasonic transducer at the measurement position; and disengaging the external wall of the tank from the external wall of the tank after the measurement has been made.

Typically the tank comprises a bottom wall having an internal surface which is inclined to the horizontal; and the method further comprises transmitting ultrasound from the transducer at the measurement position substantially vertically into the fluid via an ultrasound guide surface which is located in the interior of the tank.

The method may be used to measure the level of a variety of aircraft fluids such as fuel, water, waste or oleo fluid (an oleo being a section of telescopic tubing incorporating a spring and damper system, typically used in landing gear legs).

A further aspect of the invention provides a fluid tank comprising a bottom wall having an internal surface which is inclined to the horizontal; and an ultrasound guide surface which is located in the interior of the tank and oriented to direct ultrasound substantially vertically.

The further aspect of the invention may be used in applications other than measuring fluid levels on an aircraft.

Although the ultrasound guide surface is substantially planar in the preferred embodiment described below, in alternative embodiments this surface may be non-planar. For instance it may be concave to achieve a focussing or collimation effect on the ultrasound. In this case, although the surface is not horizontal in the strict sense (because it is not planar) the concave surface is oriented to direct the ultrasound substantially vertically.

The ultrasound guide surface may comprise a recess formed in the inclined internal surface of the bottom wall of the tank. Alternatively the tank may further comprise an ultrasound guide member having a first surface which is attached to the inclined internal surface of the bottom wall of the tank, and a second surface which is opposite to the first surface and constitutes the ultrasound guide surface. This is preferred since the member can be easily retro-fitted to an existing tank without weakening the bottom wall of the tank.

Typically the tank further comprises a visual indicator on an external surface of the bottom wall of the tank, the visual indicator indicating the position of the ultrasound guide surface.

The tank may further comprise a tag, such as an RFID tag, which can be interrogated wirelessly to retrieve information stored by the tag.

Preferably the bottom wall has an opening containing a cover with an inclined internal surface; and the ultrasound guide surface is located on the cover. This enables the ultrasound guide surface to be retrofitted to the tank easily by modifying the cover.

BRIEF DESCRIPTION OF THE DRAWINGS

Embodiments of the invention will now be described with reference to the accompanying drawings, in which:
FIG. 1 is a schematic view of an aircraft fuel tank system;
FIG. 2 is a detailed view of a wing fuel tank being interrogated by an ultrasound transducer.

DETAILED DESCRIPTION OF EMBODIMENT(S)

Figure 3:
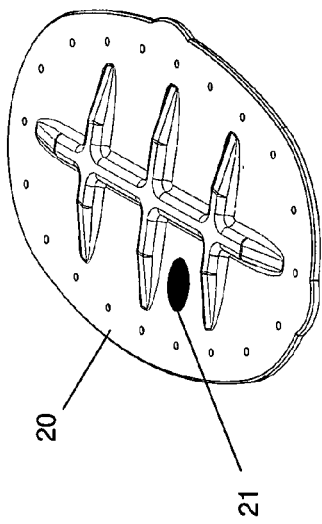
FIG. 3 is a side view of an alternative manhole cover.
Figure 4:
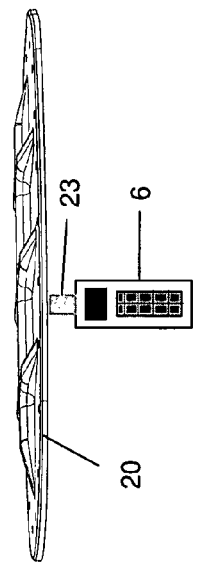
FIGS. 4 and 5 are perspective views of the internal surface of the manhole cover of FIG. 3.
Figure 5:
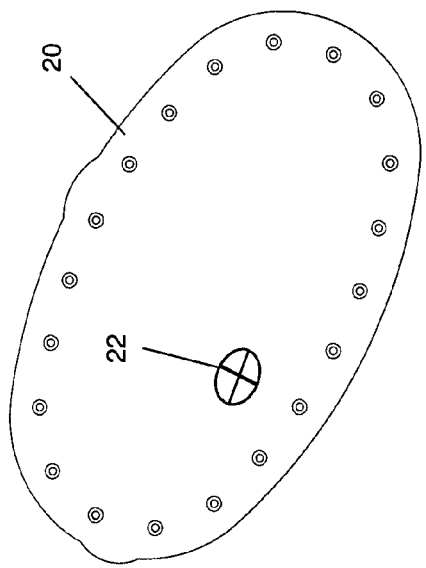
Figure 6:
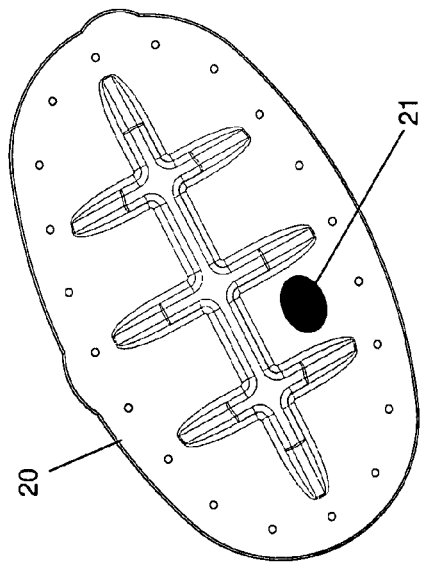
FIG. 6 is a perspective view of the external surface of the manhole cover of FIG. 3.

FIG. 1 is a schematic view of an aircraft fuel tank system. The aircraft has a centre tank 3, a pair of inner wing tanks 2,4 and a pair of outer wing tanks 1,5.

One of the inner wing tanks 4 is shown in further detail in FIG. 2. The walls of the tank are defined by an upper skin 7, a lower skin 8 (which defines the bottom wall of the tank), ribs 10 and 11, and forward and aft spars (not shown). The lower skin has an opening containing a manhole cover 9.

A wedge-shaped ultrasound guide member is bonded to the internal surface of the manhole cover 9. The guide member has a lower surface 14 which is attached to the internal surface of the manhole cover 9. Note that these surfaces are inclined to the horizontal. The upper surface 13 of the guide, opposite to the lower surface 14, is substantially horizontal. The guide member may be retrofitted to the manhole cover 9.

The level of fuel in the tank can be measured by a hand-held ultrasonic transducer 6 which engages an external surface of the manhole cover 9 as shown in FIG. 2. The transducer 6 may be carried on the aircraft or located at each Line Station as a piece of Ground Support Equipment. The transducer 6 transmits ultrasound into the fuel via the manhole cover 9 and the ultrasound guide member. The ultrasound is reflected from the fuel/air interface 12 to generate an ultrasonic echo which is received and stored at the transducer 6. The transducer 6 then deduces the fluid level based on the time of arrival of the ultrasonic echo. Specifically, for each fuel tank there is a direct correlation between the time of flight of the ultrasound and the volume of fuel held in the tank, assuming that the device is being held at a known measurement position on the tank. Therefore the device 6 carries a conversion factor for each fuel tank and each measurement position, which enables the device to convert a time of flight value into a fuel volume value. The identity of the fuel tank and measurement position currently being interrogated may be input to the device by an operator via a keypad 25, or by the device 6 wirelessly interrogating an RFID tag 15 which is bonded to the internal surface of the manhole cover 9.

The device 6 may optionally also be programmed to correct for other factors such as temperature or the inclination of the aircraft. This may be achieved by integrating temperature sensors and/or inclinometers into the device itself, or in the aircraft.

A fuel volume reading is then displayed on a screen 19 of the device and may also be stored in memory on the device. The fuel volume reading may then be manually input or downloaded into a laptop and/or the aircraft computer system.

The transducer 6 is then disengaged from the manhole cover and moved to another one of the four measurement positions shown in FIG. 1 to measure the fuel level of the other wing tanks. In addition, the transducer 6 may be moved to different measurement positions (for instance different manhole covers) for the same fuel tank and additional measurements made to improve the accuracy of the fuel volume reading.

In the absence of the ultrasound guide member, the ultrasound would be transmitted upwardly at an angle because the bottom wall of the fuel tank is inclined. The ultrasound return echo (in the absence of a guide member) is indicated by a dashed line 16 in FIG. 2 and is not aligned with the transducer. The horizontal upper surface 13 of the ultrasound guide member ensures that the ultrasound is transmitted vertically in both directions, as indicated at 18, and is aligned with the transducer 6.

If the fuel tank is completely full then the fuel may engage the internal surface of the upper skin 7, and in this case the ultrasound would be reflected by the upper skin. The echo in this case is indicated by a dashed line 17 and is not aligned with the transducer. In order to avoid this problem a second ultrasonic guide member with a horizontal lower surface may be bonded to the upper skin, directly above the measurement position. However, in general it is unlikely for the fuel tank to be completely fill with fuel so an upper guide member is not expected to be required in most cases. The measurement position may also be selected to be in a position of the fuel tank where the fuel level never (or rarely) reaches the upper skin.

An alternative manhole cover 20 is shown in FIGS. 3-6. FIG. 3 also shows the transducer 6 coupled to the manhole cover by a coupling medium 23 such as a gel. The internal surface of the manhole cover 20 carries an ultrasound guide 21. The external surface of the manhole cover 20 carries a visual indicator 22 indicating the measurement position in line with the ultrasound guide 21 on the internal surface of the tank wall.

Although the invention has been described above with reference to one or more preferred embodiments, it will be appreciated that various changes or modifications may be made without departing from the scope of the invention as defined in the appended claims.

The invention claimed is:

1. A method of measuring fluid level in an aircraft fluid tank having a bottom wall including an external surface and an inclined internal surface, comprising the steps of:
providing an ultrasound guide surface on said inclined internal surface;
moving an ultrasonic transducer to a measurement position at said external surface;
transmitting ultrasound from said ultrasonic transducer into said tank upwardly and substantially vertically through the fluid via said ultrasound guide surface;
receiving an ultrasonic echo at said ultrasonic transducer;
deducing the fluid level based on the arrival time of said ultrasonic echo; and,
removing said ultrasonic transducer from said measurement position.

2. The method of claim 1 wherein the measurement position is indicated by a visual indicator on the external surface of the wall of the tank.

3. The method of claim 1 further comprising the steps of engaging the external surface of the bottom wall of the tank with the ultrasonic transducer at the measurement position; and disengaging the ultrasonic transducer from the external surface of the bottom wall of the tank after the measurement has been made.

4. The method of claim 1 wherein the fluid is fuel.

5. A fluid tank comprising a bottom wall having an internal surface which is inclined to the horizontal; and an ultrasound guide surface which comprises a recess formed in the inclined internal surface of the bottom wall of the tank and oriented to direct ultrasound substantially vertically.

6. A fluid tank comprising an interior; a bottom wall having an internal surface which is inclined to the horizontal; and an ultrasound guide surface which is located in the interior of the tank and oriented to direct ultrasound substantially vertically, wherein the ultrasound guide surface is substantially planar and substantially horizontal.

7. A fluid tank comprising a bottom wall having an internal surface which is inclined to the horizontal; and an ultrasound guide member having a first surface which is attached to the inclined internal surface of the bottom wall of the tank and an ultrasound guide surface which is opposite to the first surface and oriented to receive ultrasound from the first surface and direct said ultrasound substantially vertically.

8. A fluid tank comprising a bottom wall having an internal surface which is inclined to the horizontal; and an ultrasound guide surface which is formed in the inclined internal surface of the bottom wall of the tank and oriented to direct ultrasound substantially vertically, the tank further comprising a visual indicator on an external surface of the bottom wall of the tank, the visual indicator indicating the position of the ultrasound guide surface.

9. The tank of claim 5 further comprising a tag which can be interrogated wirelessly to retrieve information stored by the tag.

10. The fluid tank of claim 5, wherein the bottom wall has an opening containing a cover with an inclined internal surface; and the ultrasound guide surface is located on the cover.

11. A fluid level measuring system comprising a fluid tank according to claim 5; and an ultrasonic transducer.

12. A fluid tank comprising an interior; a bottom wall having an internal surface which is inclined to the horizontal; and an ultrasound guide surface which is located in the interior of the tank and oriented to direct ultrasound substantially vertically, wherein the ultrasound guide surface is substantially planar, and a visual indicator on an external surface of the bottom wall of the tank, the visual indicator indicating the position of the ultrasound guide surface.

13. The fluid tank of claim 6, further comprising a tag which can be interrogated wirelessly to retrieve information stored by the tag.

14. A fluid level measuring system comprising a fluid tank according to claim 6; and an ultrasonic transducer.

15. A fluid tank comprising a bottom wall having an internal surface which is inclined to the horizontal; and an ultrasound guide member having a first surface which is attached to the inclined internal surface of the bottom wall of the tank and an ultrasound guide surface which is opposite to the first surface and oriented to direct ultrasound substantially vertically, and a visual indicator on an external surface of the bottom wall of the tank, the visual indicator indicating the position of the ultrasound guide surface.

16. The fluid tank of claim 7, further comprising a tag which can be interrogated wirelessly to retrieve information stored by the tag.

17. A fluid level measuring system comprising a fluid tank according to claim 7; and an ultrasonic transducer.

18. A fluid tank comprising an interior; a bottom wall having an internal surface which is inclined to the horizontal; and an ultrasound guide surface which is located in the interior of the tank and oriented to direct ultrasound substantially vertically, wherein the bottom wall has an opening containing a cover with an inclined internal surface; and the ultrasound guide surface is located on the cover, and a visual indicator on an external surface of the bottom wall of the tank, the visual indicator indicating the position of the ultrasound guide surface.

19. The fluid tank of claim 8, further comprising a tag which can be interrogated wirelessly to retrieve information stored by the tag.

20. A fluid level measuring system comprising a fluid tank according to claim 8; and an ultrasonic transducer.

* * * * *